US008412373B2

(12) United States Patent
Kangas et al.

(10) Patent No.: US 8,412,373 B2
(45) Date of Patent: Apr. 2, 2013

(54) CONVEYING SYSTEM

(75) Inventors: Petteri Kangas, Hyvinkää (FI); Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/352,094

(22) Filed: Jan. 17, 2012

(65) Prior Publication Data

US 2012/0116574 A1 May 10, 2012

Related U.S. Application Data

(63) Continuation of application No. PCT/FI2010/000052, filed on Aug. 24, 2010.

(30) Foreign Application Priority Data

Aug. 25, 2009 (FI) ..................................... 20095875

(51) Int. Cl.
*G06F 7/00* (2006.01)
*G05D 23/00* (2006.01)
*G05B 11/01* (2006.01)

(52) U.S. Cl. ........ 700/230; 700/300; 700/213; 700/214; 700/11; 700/12; 701/1; 340/991; 340/992; 340/993; 340/994

(58) Field of Classification Search ........................ None
See application file for complete search history.

(56) References Cited

U.S. PATENT DOCUMENTS

| | | | | |
|---|---|---|---|---|
| 6,633,800 | B1 * | 10/2003 | Ward et al. | 701/2 |
| 2002/0035418 | A1 | 3/2002 | Lee | |
| 2002/0174388 | A1 | 11/2002 | Hommel | |
| 2006/0089763 | A1 | 4/2006 | Barrett et al. | |
| 2006/0108874 | A1 | 5/2006 | Kalb | |
| 2006/0167608 | A1 * | 7/2006 | Makela et al. | 701/50 |

FOREIGN PATENT DOCUMENTS

| | | | |
|---|---|---|---|
| JP | 2002-241060 | A | 8/2002 |
| JP | 2006-103910 | A | 4/2006 |
| JP | 2007-119103 | A | 5/2007 |

* cited by examiner

*Primary Examiner* — Gene Crawford
*Assistant Examiner* — Yolanda Jones
(74) *Attorney, Agent, or Firm* — Birch, Stewart, Kolasch & Birch, LLP

(57) ABSTRACT

A conveying system, includes control devices for controlling the operation of the conveying system. The conveying system also includes a central control. The central control is arranged to select from a plurality of the different operating modes of the conveying system the operating mode to be used at any given time. The central control is connected to the control devices with a communications channel for indicating the operating mode selected to the control devices.

21 Claims, 3 Drawing Sheets

CONVEYING SYSTEM

CROSS-REFERENCE TO RELATED APPLICATION

This application is a Continuation of PCT International Application No. PCT/FI2010/000052 filed on Aug. 24, 2010, which claims priority under U.S.C. 119(a) of Patent Application No. 20095875 filed in Finland on Aug. 25, 2009, all of which are hereby expressly incorporated by reference into the present application.

FIELD OF THE INVENTION

The invention relates to conveying systems and more particularly to embedded control systems of escalator systems, travelator systems and elevator systems.

1. Description of Prior Art

A control system of a conveying system generally comprises a central unit, which communicates with the control devices of the conveying system via a data bus. One popular bus solution is a CAN serial communications bus.

The central unit receives measuring data from the control devices via a data bus. Using the measuring data the central unit performs control sequences and control algorithms, and sends commands to control devices via the data bus, with which commands the operation of the conveying system is adjusted in the desired direction.

The amount of data to be transferred in a conveying system has recently increased owing to, among other things, the spread of different control devices using video signals and voice signals. Also, for instance, the replacing of electrical safety devices, such as conventional relay circuits and contactor circuits, with solutions based on an electronic data bus increases the amount of data to be transferred. All this results in data buses becoming easily congested, in which case data transfer can slow down and also the reliability of data transfer deteriorates. In conveying systems, safe operation requires that at least a part of the data can be transferred within the scope of a certain maximum delay. The data transfer capacity of a conveying system can be increased, e.g. by increasing the clock frequency with which the data is transferred. In this case, however, the interference tolerance of the system often deteriorates.

2. Purpose of the Invention

Owing to the aforementioned reasons, among others, the claim presents a conveying system, which comprises control devices that function in different operating situations of the conveying system such that the problems caused by the amount of data to be transferred in the conveying system can be eliminated or at least limited.

SUMMARY OF THE INVENTION

In relation to the characteristic attributes of the invention, reference is made to the claims.

The conveying system according to the invention comprises control devices for controlling the operation of the conveying system. The conveying system also comprises a central control, which central control is arranged to select from a plurality of different operating modes of the conveying system the operating mode to be used at any given time. The central control is connected to the control devices with a communications channel for indicating the selected operating mode to the control devices, and the control device is arranged to switch from one operational state to another when the operating mode of the conveying system indicated by the central control changes.

The central control is arranged to indicate the operating mode of the conveying system preferably as a common message to at least two different control devices, and the aforementioned at least two different control devices are arranged to switch from one operational state to another when the operating mode of the conveying system indicated by the central control changes.

The aforementioned operating mode of the conveying system is preferably a drive mode of the conveying system. The drive mode of the conveying system comprises at least one of and/or a combination of the following: service drive, idle state, selected drive direction, normal drive, standby mode. Additionally the drive mode can comprise an emergency mode of the conveying system. The software controlling the operation of one or more control devices thus has a number of modes containing different statuses for at least four, preferably for at least five different drive modes of the conveying system. The program to be performed in a certain status of the software differs at least partly from the program to be performed in all other statuses.

The control device comprises preferably a connection interface and the conveying system comprises a sensor and/or actuator, which is connected to the control device via the connection interface. The control device is preferably arranged to indicate the measuring data of the sensor to the central control.

In one embodiment of the invention the communications channel comprises a first and second data transfer channel and the central unit is arranged to indicate the operating mode of the conveying system to the control devices via the first data transfer channel and the control device is further arranged to indicate the measuring data of the sensor to the central unit via the second data transfer channel.

The control device is preferably arranged to switch to an individual operational state when the operating mode of the conveying system indicated by the central unit changes. The control device preferably further comprises an operating program, which operating program comprises at least two run alternatives, which at least partly differ from each other. The control device is arranged to perform the first run alternative in the first operating mode of the conveying system and the second run alternative in the second operating mode of the conveying system.

In one embodiment of the invention at least two control devices are arranged to perform a program and/or a run alternative of the program, which at least partly differ from each other, as a response to the operating mode of the conveying system indicated by the central unit.

In a preferred embodiment of the invention the control device comprises an input for the status information of the safety sensor of the conveying system.

One control device according to the invention comprises an output for the control signal of the signaling device of the conveying system.

One control device according to the invention comprises an output for the control signal of the machinery brake.

One control device according to the invention comprises a disconnection of the power supply of the drive machinery of the conveying apparatus.

One control device according to the invention comprises an input for the measuring signal of the motion sensor of the conveying apparatus.

One control device according to the invention comprises a memory for saving the operating mode of the conveying system.

ADVANTAGES OF THE INVENTION

With the invention at least one of the following advantages is achieved, among others:

- As presented in the application, the control devices can be controlled in each specific operating mode such that the control devices operate in different operating modes of the conveying system in the manner required by each operating mode. In this case, e.g. the amount of control data and measuring data to be transferred between the central control and the control devices decreases.
- When different control devices switch from one operational state to another when the operating mode of the conveying system changes, a number of control devices can be switched essentially simultaneously from one operational state to another, e.g. by sending a signal indicating the operating mode of the conveying system as a common message from the central control to different control devices essentially simultaneously. This type of essentially simultaneous mode shifting of different control devices speeds up the operation of the conveying system.

The conveying system according to the invention can be, e.g. a conveyor system (escalator system or travelator system or corresponding) or an elevator system.

BRIEF EXPLANATION OF FIGURES

In the following, the invention will be described in more detail by the aid of some examples of its embodiments, which do not in themselves limit the scope of application of the invention, with reference to the attached drawings, wherein.

MORE DETAILED DESCRIPTION OF PREFERRED EMBODIMENTS OF THE INVENTION

Figure 1:
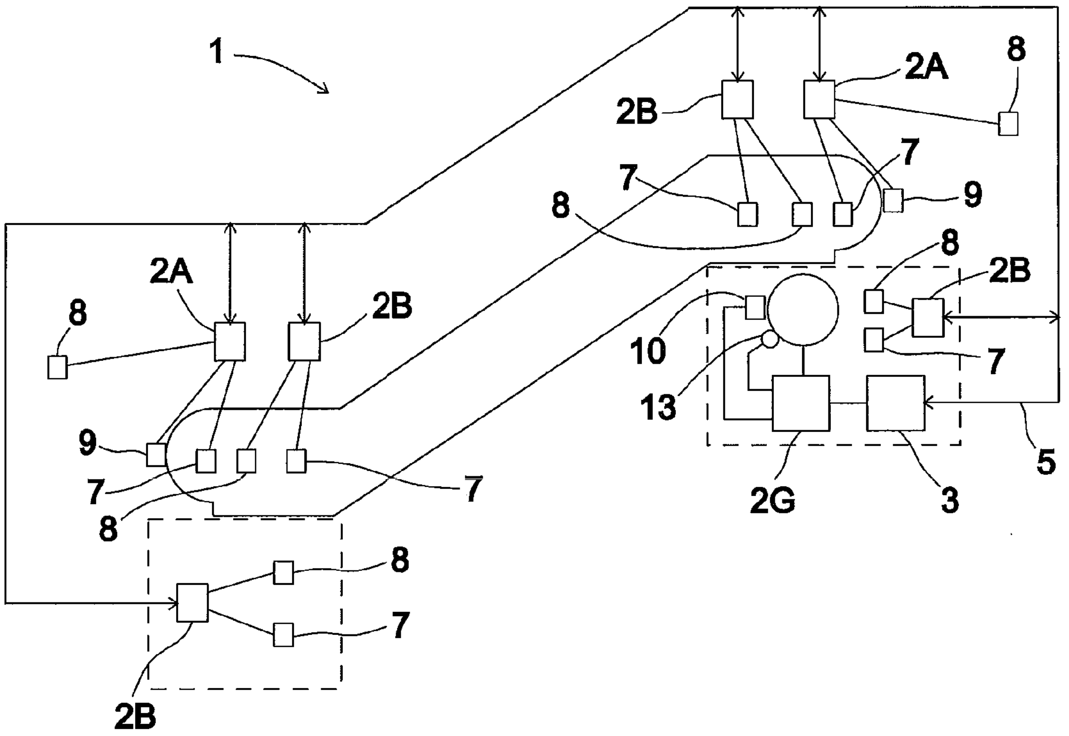
FIG. 1 presents an escalator system according to the invention

FIG. 1 presents an escalator system, which comprises control devices 2A, 2B, 2G, with which the operation of the escalator system is controlled in different operating modes. The control devices are connected to sensors 7, 8, 13 and to actuators 9, 10, 20.

The central control 3 is connected to control devices 2A, 2B, 2G with a two-channel communications channel 5. The central control 3 sends a direct-voltage signal to the first data transfer channel of the communications channel 5 as a common message for all the control devices 2A, 2B, 2G, the voltage level of which signal indicates the operating mode selected to be used in the escalator system. Certain control devices 2A, 2B, 2G switch from one operational state to another when the operating mode of the escalator system changes in a set manner, in which case these control devices start running a new operating program that at least partly differs from the earlier one. The operational state can also be individual to the control device, in which case the operating program of the control device in the operational state differs from the operating program of all the other control devices.

The central control 3 reads the measuring data of the sensors 7, 8 connected to the control devices 2A, 2B, 2G via the second data transfer channel of the communications channel 5. The read data relates to e.g. the safety, servicing need and required transport capacity of the escalator system. Data transfer in the second data transfer channel occurs using the DTMF protocol (dual tone multiple frequency). Based on the measuring data the central control 3 selects from a plurality of the different operating modes of the escalator system the operating mode of the escalator system to be used at any given time.

Most of the sensors 7, 8, 13 and actuators 9, 10, 20 are disposed in an escalator system in connection with the bottom exit and the top exit. Some sensors are safety sensors 7 measuring the safety of the escalator system whereas some 8 measure non-safety-critical issues. For instance, a tachometer or an encoder measuring the speed of the motor is used as a motion sensor 13 of the conveying apparatus; generally the speed of the handrail is also measured with a corresponding method.

The safety sensors 7 of an escalator system are, e.g. safety switches of the comb plates, safety switches of the skirting, emergency stop switches, step-break detectors, safety switches of the service drive, and safety switches monitoring the travel of the handrail. The safety sensors are arranged into a safety circuit, disconnection of which indicates a possible hazardous situation causing stopping of the step chain.

The sensors measuring non-safety-critical issues are, e.g. key start switches, stop switches, drive direction selector switches, photocells monitoring arrival, exit and presence of passengers, and also activation switches and direction selection switches of the service drive.

The actuators of the escalator system are, e.g. signaling devices such as traffic lights 9, which notify the arriving passengers of whether the escalator system is in use. Other actuators are, among others, electric machinery 20 moving the step chain and also machinery brakes 10, with which the step chain can be stopped, e.g. in an emergency.

The communications channel between the central control 3 and the control devices 2A, 2B, 2G can also be implemented as a single channel. The communications channel can also be implemented using, e.g. prior art CAN serial communications protocol or some other corresponding data transfer protocol. DTMF protocol is used here owing to its excellent interference tolerance.

Figure 4:
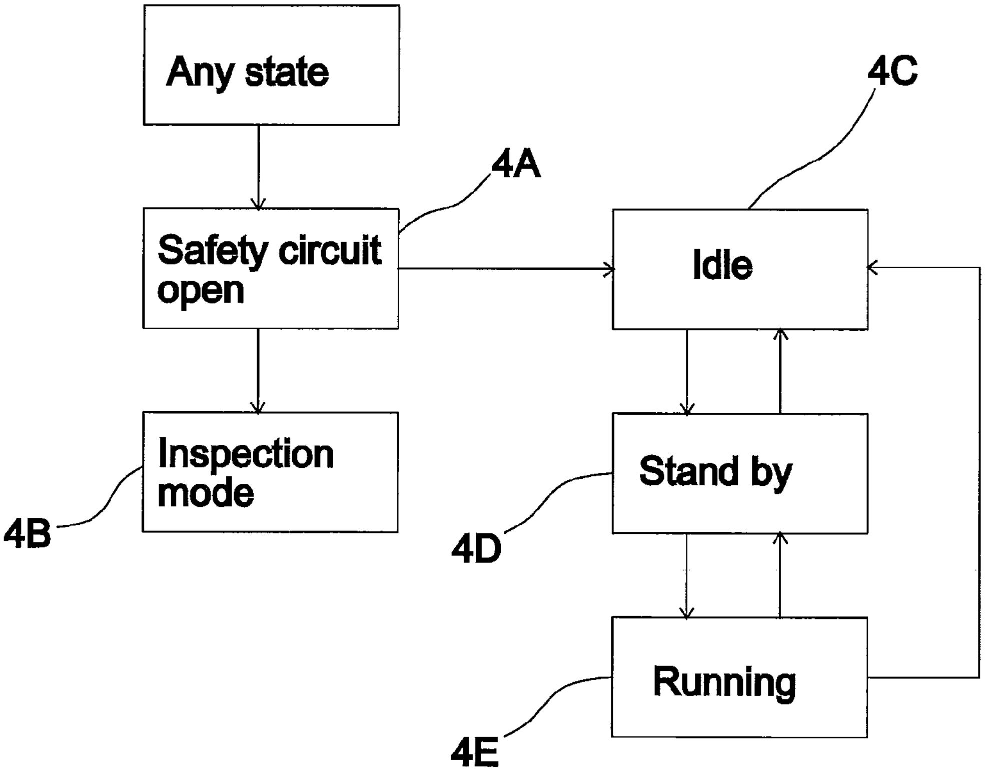
FIG. 4 presents operating modes of an escalator system according to the invention

FIG. 4 presents in more detail some operating modes 4A, 4B, 4C, 4D, 4E of an escalator system. The central control always sets an emergency mode 4A (safety circuit open), when one or more safety sensors 7 of the escalator system indicate that the safety of the escalator system is endangered. The central control sends information about the change of the operating mode via the communications channel to the control devices. In a state of emergency 4A the control devices 2A, 2B, 2G switch to operational states, in which the sending of the measuring data of the sensors measuring non-safety-critical issues to the central control 3 ceases. The power supply device 2G of the electric machinery disconnects the power supply and activates the machinery brake 10, in which case the step chain stops. The control devices 2A controlling the traffic lights 9 set the light red, which notifies the passengers that the escalator is not in use. Only that/those control device(s) that detected an emergency situation 4A in this case have the right to send measuring data reporting the state of emergency to the central control 3 via the communications channel 5.

After receiving the information from the control devices 2A, 2B about the termination of the state of emergency the central control 3 sets idle state 4C as the operating mode and sends information about that to the control devices 2A, 2B, 2G, which switch to the operational states corresponding to the idle state. In this case the traffic lights 9 are still red and the power supply to the electric machinery 20 is disconnected. The control device 2B reading the key start switch waits until the serviceman re-starts the escalator system by using a switch. In this case only the information indicating the status of the key start switch and also the information about the drive direction of the escalator indicated by the drive direction selector switch are sent from the control device 2B to the central control 3.

After the key start switch and the direction selection switch have been used, the central control 3 sets the standby up/down mode 4D and sends information about that to the control devices 2A, 2B, 2G, which switch to the operational states corresponding to the standby mode 4D. In the standby mode 4D the central control 3 awaits information about the arrival of passengers. When the control device 2A reading the photocell during the standby mode sends information about the arrival of passengers to the central control 3, the central control sets normal drive mode (running up/down) 4E and sends information about that to the control devices, which switch to the operational states corresponding to the normal drive mode 4E. In the operational state corresponding to the normal drive mode 4E the power supply device 2G opens the machinery brake 10 and starts supplying power to the electric machinery 20 moving the step chain, in which case the step chain starts moving upwards or downwards according to the drive direction selected with the direction selection switch. The control devices 2A controlling the traffic lights 9 set the light green in the direction of arrival of the passengers.

If the state of emergency 4A is caused by the switching of a safety switch of a service drive disposed in a manually-operated service drive unit to service drive mode, the central control will remain waiting for information from the service drive unit about the pressing of the activation switch of the service drive. When the activation switch of the service drive is pressed the central control sets the inspection mode 4B and sends information about that to the control devices. In the inspection mode 4B only the service drive unit generally sends information to the central control via the communications channel. At least not all the measuring data of the safety sensors read by the control devices 2A, 2B reading safety sensors is transferred to the central control 3 since the escalator can be driven in the inspection mode regardless of the status of some safety sensors. When the central control 3 receives information from the service drive unit that the direction switch of the service drive is pressed, the step chain starts to be moved in the drive direction selected with the direction switch. The service drive only continues as long as the direction switch and the activation switch are being pressed. During the service drive the traffic lights 9 are controlled to be red. Mode switching to inspection mode is only possible if only the service drive safety switch is turned into the inspection mode and at the same time all other safety switches are closed, i.e. indicate that the safety is not endangered.

The invention is described above in connection with an escalator system; however, the embodiment according to FIG. 1 is also suited, almost as such, for use in connection with a travelator system.

Figure 3:
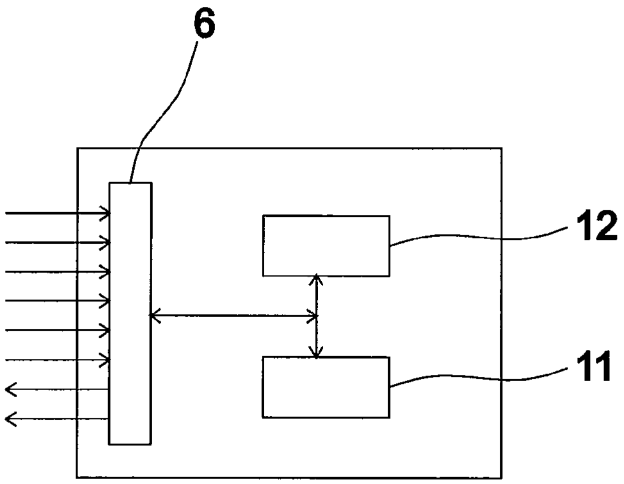
FIG. 3 presents a control device according to the invention

FIG. 3 presents a schematic diagram of a control device according to the invention. The control device is suited for use, e.g. in the embodiments described above. The control device comprises a connection interface 6, through which the control device can be connected to a communications channel, sensors and actuators. The control device comprises a processor 12, with which the operation of the control device is controlled. The software of the processor 12 is saved in the memory 11. For instance, information about the operating mode of the conveying system at any given time can also be saved in the memory 11. The program run by the processor includes at least two run alternatives that at least partly differ from each other, the first of which run alternative is performed in the first and the second in the second operational state of the control device. The operational state at any given time is selected on the basis of the operating mode of the conveying system indicated by the central control.

Figure 2:
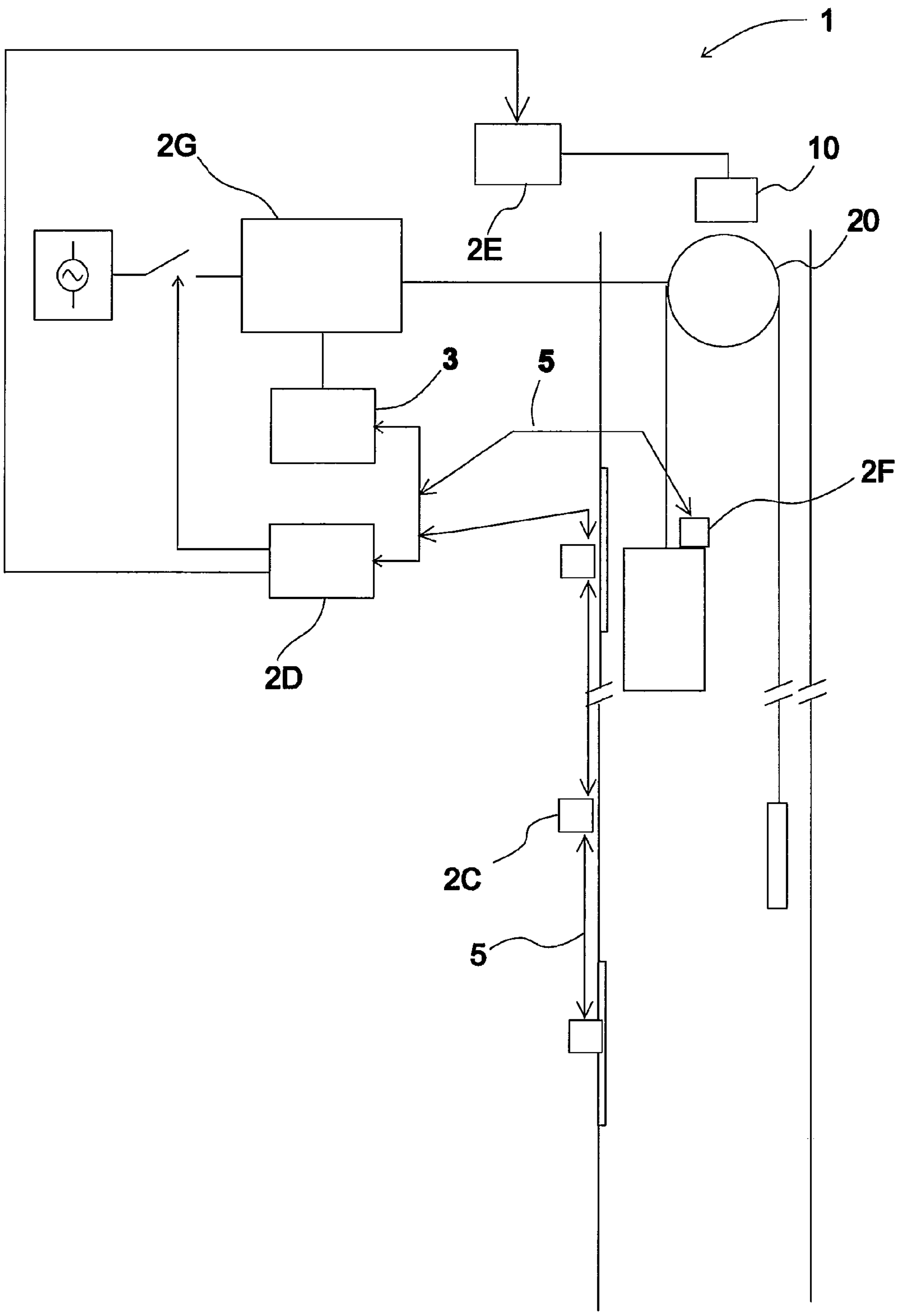
FIG. 2 presents an elevator system according to the invention

FIG. 2 presents an elevator system, which comprises control devices 2A, 2B, 2C, 2D, 2E, 2F, 2G, with which the operation of an elevator system is controlled in different operating modes. The control devices are connected to sensors 7, 8, 13 and to actuators 9, 10, 11.

The elevator control unit 3 is connected to the control devices with a serial communications bus 5. The elevator control unit 3 sends a signal to the serial communications bus 5 as a common message for all control devices 2A, 2B, 2C, 2D, 2E, 2F, 2G, which signal indicates the operating mode of the elevator system selected to be used at any given time. Certain control devices 2A, 2B, 2C, 2D, 2E, 2F, 2G switch from one operational state to another when the operating mode of the elevator system changes in a set manner, in which case these control devices start running a new operating program that at least partly differs from the earlier. The operational state can also be individual for the control device, in which case the operating program of the control device in the operational state differs from the operating program of all the other control devices.

The elevator control unit 3 reads via the serial communications bus 5 the measuring data of the sensors 7, 8 connected to the control devices 2A, 2B, 2G. The read data relates to e.g. the safety, servicing need and required transport capacity of the elevator system. Based on the measuring data the elevator control unit 3 selects from a plurality of the different operating modes of the elevator system the operating mode to be used at any given time.

The safety sensors 7 of the elevator system are, e.g. the safety switches of the landing door, safety switches of the end zone of the elevator hoistway, emergency stop switches, safety switch of the service drive, safety switch of the overspeed governor, and also a safety switch of a mechanical safety device, such as of a wedge brake, or corresponding, of the elevator car.

The sensors measuring non-safety-critical issues are, e.g. call-giving appliances, photocells monitoring arrival, exit and presence of passengers on a floor level and also control devices of the service drive.

The actuators of an elevator system are e.g. signaling devices, such as floor displays disposed on floor levels and in elevator cars, which displays notify passengers of, among other things, the position of the elevator car in the elevator hoistway. Other actuators are, among others, a hoisting machine 20 moving the elevator car via the elevator ropes, and machinery brakes 10, which are activated when the elevator car stops on a floor and also, e.g. in connection with an emergency stop.

The measuring data of the safety sensors of an elevator system is read with measuring circuits 2C. The measuring circuits 2C are connected with a serial communications bus 5 to the monitoring unit 2D, which determines, when necessary, an operational non-conformance in an elevator system on the basis of the measuring data of the safety sensors. After detecting an operational non-conformance the monitoring unit 2D sends an activation signal of the machinery brake to the brake control unit 2E and disconnects the power supply to the hoisting machine by opening the main contactor. In addition, the monitoring unit 2D sends information about the operational non-conformance to the elevator control unit 3.

Other control devices of an elevator system are, e.g. a frequency converter 2G supplying power to the hoisting machine 20 and also a control unit 2F of the car roof.

The elevator control unit 3 always sets a state of emergency 4A (safety circuit open), when the control unit 2D indicates an operational non-conformance in the elevator system. The elevator control unit 3 sends information about the change of the operating mode via the serial communications bus to the control devices. In a state of emergency 4A the control devices switch to the operational states in which the measuring data of the sensors measuring non-safety-critical issues is neither sent to the elevator control unit 3 nor to the monitoring unit 2D. Landing displays are controlled with control devices to notify the elevator passengers that the elevator system is not in use. Only that/those control device(s) that detected the state of emergency 4A in this case have the right to send measuring data reporting the state of emergency to the monitoring unit 2D via the serial communications bus.

After receiving the information from the monitoring unit 2D about the termination of the state of emergency, the elevator control unit 3 sets the idle state 4C as the operating mode and sends information about that to the control devices, which switch to the operational states corresponding to the idle state. In this case the landing displays still notify the passengers that the elevator system is not in use. The power supply to the electric machinery is also disconnected. Returning the elevator system to its normal drive mode 4E requires that a serviceman presses the acknowledgement button of the idle state disposed in connection with the control unit 2D. In this case in the idle state 4C only the information indicating the status of the acknowledgement button is sent from the monitoring unit 2D to the elevator control unit 3.

After the acknowledgement button of the idle state 4C is pressed, the elevator control unit 3 sets the normal drive mode 4E and sends information about that to the control devices, which switch to the operational states corresponding to the normal drive mode 4E.

If the state of emergency 4A is caused by switching a service drive safety switch to inspection mode, the elevator control unit 3 will remain waiting for information from the service drive unit about the pressing of the activation switch of the service drive. When the activation switch of the service drive is pressed the elevator control unit 3 sets the inspection mode 4B and sends information about that to the control devices. In the inspection mode 4B generally only the service drive unit sends information to the elevator control unit 3 via a serial communications bus 5. At least not all the data of the control devices reading the safety sensors 7 is transferred from the monitoring unit 2D to the elevator control unit 3 since in the inspection mode the elevator can be driven regardless of the status of most of the safety sensors. When the elevator control unit 3 receives information from the service drive unit that the direction switch of the service drive is pressed, the elevator car starts to be moved in the drive direction selected with the direction switch. The service drive only continues as long as the direction switch and the activation switch are being pressed. The service drive unit is here arranged as a part of the control unit 2F of the car roof but it can also be disposed elsewhere in the elevator hoistway, e.g. in the pit of the elevator hoistway.

The invention is not limited solely to the embodiments described above, but instead different variations are possible within the scope of the inventive concept defined by the claims below.

The invention claimed is:

1. A conveying system, comprising:

control devices for controlling operation of the conveying system; and a central control, wherein the control devices are located outside of the central control;

wherein the central control is arranged to select from a plurality of the different operating modes of the conveying system an operating mode to be used at any given time, wherein the central control is connected to the control devices via a communications channel for indicating the selected operating mode to the control devices, and at least a portion of the communications channel located between the central control and the control devices is external to the central control, and wherein at least one of the control devices is arranged to switch from one operational state to another when the operating mode of the conveying system indicated by the central control changes.

2. The conveying system according to claim 1, wherein the central control is arranged to indicate the operating mode of the conveying system as a common message to at least two different control devices; and the at least two control devices are arranged to switch from one operational state to another when the operating mode of the conveying system indicated by the central control changes.

3. The conveying system according to claim 2, wherein the operating mode of the conveying system comprises a drive mode of the conveying system.

4. The conveying system according to claim 2, wherein the control device comprises a connection interface, and the conveying system comprises a sensor and/or actuator, which is connected via a connection interface to the control device.

5. The conveying system according to claim 2, wherein the communications channel comprises a first data transfer channel and a second data transfer channel, and the central control is arranged to indicate the operating mode of the conveying system to the control devices via the first data transfer channel, and the control device is arranged to indicate the measuring data of a sensor to the central control via the second data transfer channel.

6. The conveying system according to claim 1, wherein the operating mode of the conveying system comprises a drive mode of the conveying system.

7. The conveying system according to claim 6, wherein the control device comprises a connection interface, and the conveying system comprises a sensor and/or actuator, which is connected via a connection interface to the control device.

8. The conveying system according to claim 1, wherein the control device comprises a connection interface, and the conveying system comprises a sensor and/or actuator, which is connected via a connection interface to the control device.

9. The conveying system according to claim 8, wherein the control device is arranged to indicate the measuring data of the sensor to the central control.

10. The conveying system according to claim 1, wherein the control device is arranged to switch to an individual operational state when the operating mode of the conveying system indicated by the central control changes.

11. The conveying system according to claim 1, wherein the control device comprises an operating program, which operating program comprises at least two run alternatives that at least partly differ from each other, and the control device is arranged to perform the first run alternative in the first operating mode of the conveying system, and the control device is arranged to perform the second run alternative in the second operating mode of the conveying system.

12. The conveying system according to claim 1, wherein at least two control devices are arranged to run a program and/or a run alternative of the program that at least partly differ from each other as a response to the operating mode of the conveying system indicated by the central unit.

13. The conveying system according to claim 1, wherein the control device comprises an input for the status information of the safety sensor of the conveying system.

14. The conveying system according to claim 1, wherein the control device comprises an output for the control signal of the signaling device of the conveying system.

15. The conveying system according to claim 1, wherein the control device comprises an output for the control signal of the machinery brake.

16. The conveying system according to claim 1, wherein the control device comprises a disconnection of a power supply of the drive machinery of the conveying apparatus.

17. The conveying system according to claim 1, wherein the control device comprises an input for the measuring signal of a motion sensor of the conveying apparatus.

18. The conveying system according to claim 1, wherein the control device comprises a memory for saving the operating mode of the conveying system.

19. The conveying system according to claim 1, wherein the operating mode of the conveying system comprises at least one of and/or a combination of the following:

Service drive;

Idle state;

Selected drive direction;

Normal drive; and

Standby mode.

20. The conveying system according to claim 1, wherein one of the operating modes is an emergency mode, and sending of measuring data of non-safety-critical issues from the control devices to the central control via the communications channel ceases in the emergency mode.

21. A conveying system, comprising:

control devices for controlling operation of the conveying system; and a central control;

wherein the central control is arranged to select from a plurality of the different operating modes of the conveying system an operating mode to be used at any given time, wherein the central control is connected to the control devices with a communications channel for indicating the selected operating mode to the control devices, wherein at least one of the control devices is arranged to switch from one operational state to another when the operating mode of the conveying system indicated by the central control changes, and wherein the communications channel comprises a first data transfer channel and a second data transfer channel, and the central control is arranged to indicate the operating mode of the conveying system to the control devices via the first data transfer channel, and the control device is arranged to indicate the measuring data of a sensor to the central control via the second data transfer channel.

* * * * *